(12) United States Patent
Tintillier et al.

(10) Patent No.: US 12,157,699 B2
(45) Date of Patent: Dec. 3, 2024

(54) ULTRA-LIGHT MINERAL FOAM HAVING WATER REPELLENT PROPERTIES

(71) Applicant: HOLCIM TECHNOLOGY LTD, Zug (CH)

(72) Inventors: Patrick Tintillier, Holderbank (CH); Sébastien Georges, Holderbank (CH)

(73) Assignee: HOLCIM TECHNOLOGY LTD, Zug (CH)

( * ) Notice: Subject to any disclaimer, the term of this patent is extended or adjusted under 35 U.S.C. 154(b) by 1017 days.

(21) Appl. No.: 17/059,691

(22) PCT Filed: May 29, 2019

(86) PCT No.: PCT/EP2019/063955
§ 371 (c)(1),
(2) Date: Nov. 30, 2020

(87) PCT Pub. No.: WO2019/229121
PCT Pub. Date: Dec. 5, 2019

(65) Prior Publication Data
US 2021/0214278 A1    Jul. 15, 2021

(30) Foreign Application Priority Data
May 30, 2018  (EP) .................................. 18305662

(51) Int. Cl.
| C04B 24/26 | (2006.01) |
| C04B 28/04 | (2006.01) |
| C04B 38/10 | (2006.01) |
| C04B 103/00 | (2006.01) |
| C04B 103/48 | (2006.01) |
| C04B 111/27 | (2006.01) |
| C04B 111/40 | (2006.01) |

(52) U.S. Cl.
CPC ...... C04B 24/2682 (2013.01); C04B 24/2623 (2013.01); C04B 24/2664 (2013.01); C04B 28/04 (2013.01); C04B 38/10 (2013.01); C04B 2103/0052 (2013.01); C04B 2103/48 (2013.01); C04B 2111/27 (2013.01); C04B 2111/40 (2013.01); C04B 2201/20 (2013.01)

(58) Field of Classification Search
CPC ........... C04B 24/2682; C04B 24/2623; C04B 24/2664; C04B 28/04; C04B 38/10; C04B 2103/0052; C04B 2103/48; C04B 2111/27; C04B 2111/40; C04B 2201/20; C04B 2111/28; C04B 2111/52; C04B 2201/30; C04B 7/527
See application file for complete search history.

(56) References Cited

U.S. PATENT DOCUMENTS

| 4,086,200 A | 4/1978 | Lamoria et al. |
| 5,109,030 A * | 4/1992 | Chao .................... C04B 24/2641 521/149 |
| 2012/0286190 A1 * | 11/2012 | Prat ........................ C04B 28/16 252/62 |
| 2017/0130117 A1 | 5/2017 | Gordon et al. |
| 2017/0158568 A1 | 6/2017 | Lombois-Burger et al. |

FOREIGN PATENT DOCUMENTS

| DE | 10 2010 062762 A1 | 6/2012 |
| EP | 0 628 523 A1 | 12/1994 |
| EP | 2 045 227 A1 | 4/2009 |
| EP | 3 176 137 A1 | 6/2017 |
| SU | 514000 A1 | 5/1976 |
| WO | WO 2011/086333 A2 | 7/2011 |
| WO | WO 2017/085416 A1 | 5/2017 |
| WO | WO 2017/093795 A1 | 6/2017 |
| WO | WO 2017/093796 A1 | 6/2017 |
| WO | WO 2017/093797 A1 | 6/2017 |

OTHER PUBLICATIONS

Abdourahman, D.A. et al. Generation and stability of cement soap films. Soft Matter, 2021, 17, 2429-2438. (Year: 2021).*
International Search Report as issued in International Patent Application No. PCT/EP2019/063955, dated Jun. 26, 2019.
Samoshina E.N. et al., "Studies of the effect of stabilizing additives on the properties of foam in the manufacture of foam concrete," Modern problems of Science and Education, (Year: 2015), N1-1 (abstract in English available on p. 2 of the document).
First Examination Report and Search Report as issued in United Arab Emirates Application No. P6001676/2020, dated Dec. 8, 2023.

* cited by examiner

*Primary Examiner* — Michael M Dollinger
*Assistant Examiner* — Christina H. W. Rosebach
(74) *Attorney, Agent, or Firm* — Pillsbury Winthrop Shaw Pittman LLP

(57) ABSTRACT

A process for producing a mineral foam having water repellent properties includes a) separately preparing a slurry of cement and an aqueous foam, wherein the cement slurry includes water, at least one water repellent agent different from organosilicon compound, and Portland cement and the aqueous foam includes a co-stabiliser; b) contacting the slurry of cement with the aqueous foam to obtain a slurry of foamed cement; and c) casting the slurry of foamed cement and leave the slurry of foamed cement to set.

18 Claims, No Drawings

ULTRA-LIGHT MINERAL FOAM HAVING WATER REPELLENT PROPERTIES

CROSS-REFERENCE TO RELATED APPLICATIONS

This application is the U.S. National Stage of International Application Serial No. PCT/EP2019/063955, filed May 29, 2019, which in turn claims priority to European Application No. 18305662.1, filed May 30, 2018. The contents of all of these applications are incorporated herein by reference in their entirety.

BACKGROUND OF THE INVENTION

The present invention refers to an ultra-light mineral foam using a cement, to its production process, to the use of this foam in buildings, and to elements of construction comprising these foams.

Mineral foams, and in particular cement foams, are known and used for their excellent properties such as thermal insulation, acoustic insulation, high durability, fire resistance and its easy implementation.

A mineral foam is a material in the form of foam. This material has a lower density than typical concrete due to the presence of a high volume fraction of pores or empty spaces.

These pores or empty spaces are due to the presence of air in the mineral foam and they may be in the form of bubbles. An ultra-light mineral foam is understood to be a mineral foam generally having a density in its dry state of between 20 and 200 $kg/m^3$.

A mineral foam is a material that is in general prepared by mixing a liquid cement slurry and an aqueous foam, preferably continuously. The mixing process of the two components is carried out before the initial setting time of the cement, and the mineral foam is said to remain in a fresh state until the cement starts to set. In its fresh state, the mineral foam can therefore be easily transported by, for example pumping, and placed in the construction element where it will later be used for one or several of its desirable properties. Being in a liquid and plastic state, the fresh mineral foam is then able to adequately fill the voids in which it is placed, ensuring optimal insulation properties to the final construction element.

The cement slurry is typically a mixture of cement, water, and includes one or several chemical admixtures to adjust its rheological properties and to accelerate or retard the setting time of the cement. The aqueous foam is prepared using a foam generator into which a mixture of a foaming agent and water is added.

The technical advantages of mineral foams are strongly related to one key feature: the final density of the foam, expressed in $kg/m^3$ in its dry state. This constitutes in practice one of the main challenges related to the production of low density mineral foams. While still in its fresh state, the mineral foam is indeed subject to several physical mechanisms that may destabilise it, such as Ostwald ripening or coalescence of the air bubbles. The process of preparation and placing of the fresh mineral foam also has a strong impact of the final density, as too much shearing or mechanical stress from a pumping system would destabilise the foam. Last but not least, when compared to organic foams, the use of cement as a binder of mineral foams results in a significantly higher weight, which exacerbates the destabilisation phenomena. All these destabilisation phenomena occur while the mineral foam is fresh, and therefore plastic, stage.

As an illustration, the thermal conductivity of a mineral foam in its final dry state is proportional to its density. It therefore appears obvious that many inventions related to mineral foams focus on minimising the density of the foam, and therefore reducing as much as possible the destabilisation of the mineral in its fresh state.

Several cement based mineral foams have been described in the prior art, and focus very often on reducing the cement setting time, in order to reduce the total duration the mineral foam spends in its fresh state, and therefore reduce the destabilisation phenomena disclosed above may occur. For example WO2011086333 discloses a mineral foam that uses an aluminate cement as a binder, because of the short setting times of such binders, and also teaches that in order to produce mineral foam of low or ultra-low density, the setting time of the binder should be as short as possible. Even though technically correct, this approach comes with several drawbacks. The short setting times render a full scale production process complex, and a typical drawback is that any interruption of the production process would result in the loss of the desired rheological properties of the cement slurry or the fresh mineral foam. In the worst case, the cement would set before the fresh mineral foam is produced or placed.

Other patents aim at solving the problem mentioned above but using a binder composed of ordinary Portland cement, to which different types of accelerators are added. Very short setting times are not a key requirement anymore. WO2017093796 discloses the use of calcium silicate hydrate crystallization seeds to, WO2017093795 discloses the use of magnesium salts, WO2017093797 discloses the use of aluminium salts, and WO2017085416 discloses the combined use of calcium silicate and sodium silicate.

As already mentioned, many uses and applications of mineral foams require that they placed into voids of construction elements to increase, for example, thermal insulation. In such applications, the mineral foam can be used to fill voids of concrete blocks that are then used to build walls. Once the wall is erected, the mineral foam is protected from its environment. In other cases, mineral foams can be used to fill open voids that expose the mineral foam to its surrounding environment. For example, a mineral foam can be used for wall backfilling to improve the thermal insulation of an existing building. In such a application, some parts of the mineral foam are exposed, and are able to absorb water and humidity. This water intake results in a loss of thermal insulating properties, and also results in additional deterioration of the mineral foam by, for example, fungal growth.

There is therefore a need for low or ultra-low density mineral foams that are able to limit or even suppress water absorption. For example, a surface treatment could be done to create an impermeable physical barrier that prevents water to penetrate into the core of the mineral foam. This approach has however strong limitations. In many cases, the surfaces through which water could migrate into the core of the mineral foam are difficult or sometimes impossible to reach and treat, such as the lower surface of a mineral foam that in pumped in between two neighbouring walls of an already existing construction. Also, low and ultra-low density mineral foams have a very low mechanical strength, and tend to easily crumble when being manipulated. A surface sealant would then easily be broken in some places during the manipulation of the mineral foam, or during the work at the job site for example if the mineral foam needs to be cut, pierced or drilled through. A surface treatment also requires an additional step in its production process, which increases the production costs and complexity.

A more preferable approach would be to integrate the water repelling property within the core of the mineral foam, as it is done in many watertight concrete and mortar compositions. Very often, the water repellent agent that is used is typically an organic compound with hydrophobic properties. Fatty acids such as calcium stearate, calcium oleate, silicon oils or an organosilanes are regularly used in such applications. As the foaming agents used to prepare a mineral foam are also surfactants, the addition of any water repellent agent becomes therefore an immediate technical challenge. The foaming agent would indeed in many cases preferentially interact with the newly added water repellent agent, and would therefore not able to stabilise adequately the fresh mineral foam. The final result would be an immediate destabilisation of the foam and an increase of the density of the final mineral foam.

The patent DE102010062762 discloses a mineral foam composition that also contains silicone oil to reduce water ingress. The silicone oil, having a molecular mass of 50000 to 200000 Daltons, preferably 125000 to 150000 Daltons, is incorporated in the cement slurry that is later mixed with the organic foam. The silicon oil can also be added during the step that consists of mixing the cement slurry and the foam. The example 2 discloses a mineral foam that contains silicone oil and has a dry density of 130 kg/m$^3$. This patent does not disclose mineral foams of lower density than 130 kg/m$^3$.

This invention aims at solving the above mentioned problems by providing stable ultra-low density mineral foams that have water repellent properties. The invention also provides the method of preparation and uses of these mineral foams.

BRIEF DESCRIPTION OF THE INVENTION

It was surprisingly found that a water repellent agent other than organosilicon compound can be added to form ultra-low density mineral foams that have water repellent properties. In addition, the mineral foam is stable.

In addition, it was surprisingly found that the combination of said water repellent agent and a co-stabiliser enables to obtain ultra-low density water repellent mineral foams, in particular mineral foams having a density in its dry state of between 20 and 150 kg/m$^3$, in particular between 20 and less than 130 kg/m$^3$. In addition, the stability of the mineral foam is further improved in that the density in fresh state which is reached correspond to the theoretical one. When used separately:
  the co-stabiliser alone does not confer water repellent properties to the final mineral foam,
  the water repellent agent alone does not result in mineral foams having a density in its dry state below 150 kg/m$^3$, in particular below 130 kg/m$^3$. In addition, when the water repellent agent is used alone, the density in fresh state which is reached differs from the target. This difference can be tolerated in some applications but can also be problematic in other applications. Indeed, as the thermal insulation of the mineral foam being proportional to its density, it is essential to master it precisely. The certification of building components used as insulation, such as blocks, panels, or roofs, is based on the value of thermal conductivity. On the other hand, applications such as filling cavities (old mines) or road foundations are mainly related to the mechanical strength of the foam.

This particularly interesting performance of dry density below 150 kg/m$^3$ and fresh density corresponding to the target is then attributed to a synergistic effect between the water repellent agent and the co-stabiliser.

The present invention therefore relates to a process for the production of a mineral foam with water repellent properties, according to the following steps:
  a) Separately preparing a slurry of cement and an aqueous foam, wherein the cement slurry comprises water (W), at least one water repellent agent different from organosilicon compound, and Portland cement (C);
  b) Contacting the slurry of cement with the aqueous foam to obtain a slurry of foamed cement
  c) Casting the slurry of foamed cement and leave it to set.

The slurry of foamed cement may optionally comprise a co-stabiliser. The co-stabiliser is advantageously added in the aqueous foam, in particular in the aqueous solution comprising the foaming agent.

The invention also relates to the use of a water repellent agent different from organosilicon compound for the manufacture of ultra-low density water repellent mineral foams.

According to another feature of the invention, a mineral foam is provided that is obtained or obtainable by the process of the invention. The foam according to the invention may be used as construction material or insulating material. For example, the mineral foam may be poured between two panels of gypsum boards, or between two brick walls or between two load-bearing concrete walls.

The invention also relates to elements of construction comprising a mineral foam according to the invention.

The process provided by the present invention has one or more of the following characteristics:
  the process is universal, which is to say it makes it possible to produce a stable mineral foam from any type of Portland cement, including mixtures of Portland cement with mineral particles;
  the process is easy to implement;
  the process can be easily transported to any site or jobsite;
  the process makes it possible to implement a mineral foam in a continuous manner. It is therefore possible to produce the mineral foam continuously and to pour this foam without interruption.

The mineral foam provided by the instant invention has one or more of the following characteristics:
  the mineral foam has water repellent properties. The water absorption at 24 hours of the mineral foam is less than 2 kg/m$^2$, preferably less than 1.5 kg/m$^2$, more preferably less than 1 kg/m$^2$, even more preferably less than 0.5 kg/m$^2$. Alternatively, the water absorption at 24 hours can be above 0.2 kg/m$^2$. In an embodiment, the water absorption of the mineral foam is comprised between 0.2 and 1 kg/m$^2$, preferentially between 0.2 and 0.5 kg/m$^2$;
  the mineral foam has a density in its dry state of between 20 kg/m$^3$ and 200 kg/m$^3$. In preferred embodiments, the mineral foam has a density in its dry state of between 50 kg/m$^3$ and 150 kg/m$^3$, even more preferentially between 50 kg/m$^3$ and 130 kg/m$^3$;
  the mineral foam according to the invention has excellent stability properties. In preferred embodiments, the mineral foam has a fresh density corresponding to the target;
  the mineral foam according to the invention has excellent thermal properties, and in particular very low thermal conductivity. It is highly desirable to reduce thermal conductivity in construction materials since this makes it possible to obtain savings of heating energy for residence and office buildings. Furthermore, this decrease makes it possible to reduce thermal bridges, in particular in the construction of buildings several stories high and designed using indoor thermal insulation. In particular thermal bridges are reduced on the intermediary floors.

A particular advantage of the method of the present invention is that it enables to produce a mineral foam that has water repellent properties and in which the water repellent agent and the co-stabiliser if any are homogeneously distributed within the final mineral foam. As a result the mineral foam retains its water repelling properties if the mineral foam is cut into a specific shape, damaged, or pierced through.

Definitions

A mineral foam having water repellent properties is a mineral foam whose water absorption at 24 hours is less than 2 kg/m$^2$, preferably less than 1.5 kg/m$^2$, more preferably less than 1 kg/m$^2$, even more preferably less than 0.5 kg/m$^2$.
Measurement of Water Absorption of Mineral Foams Water repellent characteristics are measured according to the French standard NF EN 1609 (May 2013). The testing principle consists in preparing a block of mineral foam (length: 20 cm, width: 20 cm, height: 10 cm), and then drying it. This is achieved by placing the block of mineral foam in a chamber at 23° C. and 50% relative humidity for the excess water to evaporate. The drying is considered complete once the weight of the block is stable.

As indicated in the standard NF EN 1609 (May 2013). The lower part of dry blocks is then immersed in water at a depth of 1 cm for a duration of 24 hours at 20° C. The weight change of the block due to water intake is its water absorption, and characterises its water repellent performance. Water absorption is expressed in kilograms of water per square metre (kg/m$^2$) of surface in contact with water.

The terms "ultra-light mineral foam" or "ultra-low density mineral foam" are used interchangeably and are both to be understood as defining a mineral foam having a density in its dry state below 200 kg/m$^3$, in particular of between 20 kg/m$^3$ and 200 kg/m$^3$. The density of a mineral foam in its dry state is also called "dry density". The density of a mineral foam in its fresh state is also called "fresh density" or "wet density".
Measurement of the Density of Mineral Foams Two types of density can be measured: the dry density or the fresh density of the mineral foam.

The dry density can be measured by determination of the density of the block of mineral foam after is has been produced and dried as described immediately above for measurement of water absorption. Since the blocks of dry mineral foam have a predetermined size, weighting them is sufficient to derive their dry density, expressed in kg/m$^3$.

The fresh density, also sometimes referred to as the wet density, corresponds to the density of the mineral foam immediately after its production, before the cement sets and before water is able to evaporate. The measurement principle is very simple: a mould of a specific volume is filled with fresh mineral foam, and is weighed. The fresh density is easily derived from this measurement.

A "stable mineral foam", or a mineral foam having "stability properties", refers to a mineral foam that does not collapse or only very slightly when the foam is poured vertically or from a considerable height. For example, the mineral foam according to the invention does not collapse or only very slightly when it is poured vertically from a height greater than or equal to 2 metres.

The theoretical fresh density (id est the target) can be calculated from the flow of the cement slurry and of the aqueous foam using the following equation:

$$d_{MF} = \frac{d_S + M_{AF} \times \frac{d_S}{M_S}}{\frac{M_{AF}}{d_{AF}} \times \frac{d_S}{M_S} + 1} \quad (1)$$

Wherein:

$M_{AF}$ is the mass of aqueous foam $M_S$ is the mass of cement slurry $d_S$ is the density of the cement slurry $d_{MF}$ is the density of the fresh mineral foam $d_{AF}$ is the density of the aqueous foam Equation (1) is directly derived from the general relation:

$$M_{AF} = M_S \times \frac{d_S - d_{MF}}{d_S} \times \frac{d_{AF}}{d_{MF} - d_{AF}} \quad (2)$$

wherein $M_{AF}$, $M_S$, $d_S$, $d_{MF}$ and $d_{AF}$ are as defined for equation (1).

In preferred embodiments, the mineral foam has a fresh density corresponding to the theoretical one. In such a case, the mineral foam has thus improved stability properties since the foam was not destabilised during mixing of the cement slurry and the aqueous foam.

The term "corresponding to" means that the measured fresh density differs from the theoretical fresh density (the target) by less than 7%, preferably less than 5%.

A mineral foam having "excellent thermal properties", also described as "very low thermal conductivity", refers to a mineral foam having a thermal conductivity measured at 23° C. and 50% relative humidity below 0.160 W/m·K.

Thermal conductivity (also called lambda ($\lambda$)) is a physical value characterizing the behaviour of materials during the transfer of heat by conduction. Thermal conductivity represents the quantity of heat transferred per unit of surface and per unit of time submitted to a gradient of temperature. In the international system of units, thermal conductivity is expressed in watts per metre Kelvin (W/m·K). Typical or conventional concretes have thermal conductivity values measured at 23° C. and 50% relative humidity of 1.3 to 2.1.

An organosilicon compound refers to any compound comprising Si—O or Si—C bonds such as silanes, polysilanes, siloxanes, polysiloxanes, including silicone oils.

In the present invention, at least one water repellent agent, which is not an organosilicon compound, is used. Accordingly, in the present description, the terms "water repellent agent" will refer to a water repellent agent which is not an organosilicon compound.

These generic terms will encompass embodiment where only one water repellent agent is used and embodiments where at least two water repellent agents are used.

The terms "latex of polymer" refers to a dispersion or an emulsion of polymer in water.

DETAILED DESCRIPTION OF THE INVENTION

Water Repellent Agent

At least one water repellent agent different from an organosilicon compound is added in the slurry of cement prepared in step (i).

In the present invention, the water repellent agent is preferably an organic polymer, more preferably a latex of organic polymer, more preferable a latex of thermoplastic organic polymer.

The polymer is preferably a copolymer of ethylenically unsaturated monomers. The water repellent agent is preferentially a vinyl chloride-ethylene copolymer, a vinyl acetate-ethylene copolymer, or a mixture therefore of.

The vinyl chloride-ethylene copolymer contains preferably 50% to 95% by weight of vinyl chloride units, 5% to 30% by weight of ethylene units, more preferably 75% to 90% by weight of vinyl chloride units, 10% to 25% by weight of ethylene units, based in each case on the total weight of the copolymer.

In said vinyl chloride-ethylene copolymer, if desired, it is also possible for up to 20% by weight of further comonomers to have been copolymerized. Examples thereof are monomers from the group consisting of vinyl esters, (meth)acrylic esters and vinylaromatics. Suitable vinyl esters are those of carboxylic acids having 1 to 12 carbon atoms. Preference is given to vinyl acetate, 1-methylvinyl acetate, vinyl esters of α-branched monocarboxylic acids having 9 to 11 carbon atoms, vinyl esters of linear monocarboxylic acid having 1 to 12 carbon atoms. Suitable monomers from the acrylic and methacrylic ester group are esters with branched or unbranched alcohols having 1 to 15 carbon atoms. Preferred acrylic and methacrylic esters are methyl acrylate, methyl methacrylate, n-butyl acrylate, t-butyl acrylate and 2-ethyl-hexyl acrylate. A preferred vinylaromatic is styrene.

If desired it is also possible for 0.1% to 5% by weight, based on the total weight of the monomer mixture, of auxiliary monomers to be copolymerized. Preference is given to ethylenically unsaturated monocarboxylic and dicarboxylic acids such as acrylic acid and methacrylic acid; ethylenically unsaturated carboxamides and carbonitriles such as acrylamide and acrylonitrile; and ethylenically unsaturated sulphonic acids and their salts, preferably vinylsulphonic acid or 2-acrylamido-2-methylpropanesulphonic acid. Further examples are pre-crosslinking comonomers such as polyethylenically unsaturated comonomers, examples being divinyl adipate, diallyl maleate, allyl methacrylate and triallyl cyanurate, or post-crosslinking comonomers, examples being N-methylolacrylamide (NMA), alkyl ethers such as the isobutoxy ether or esters of N-methylolacrylamide.

The vinyl acetate-ethylene copolymer contains preferably 5% to 50% by weight of vinyl acetate units, 30% to 95% by weight of ethylene units, more preferably 5% to 35% by weight of vinyl acetate units, 50% to 95% by weight of ethylene units.

In said vinyl acetate-ethylene copolymer, if desired it is also possible for up to 20% by weight of further comonomers to have been copolymerized. Examples thereof are monomers from the group consisting of vinyl chloride, other vinyl esters, (meth)acrylic esters and vinylaromatics. Suitable vinyl esters are those of carboxylic acids having 1 to 12 carbon atoms. Preference is given to 1-methylvinyl acetate, vinyl esters of α-branched monocarboxylic acids having 9 to 11 carbon atoms, vinyl esters of linear monocarboxylic acid having 1 to 12 carbon atoms. Suitable monomers from the acrylic and methacrylic ester group are esters with branched or unbranched alcohols having 1 to 15 carbon atoms. Preferred acrylic and methacrylic esters are methyl acrylate, methyl methacrylate, n-butyl acrylate, t-butyl acrylate and 2-ethyl-hexyl acrylate. A preferred vinylaromatic is styrene.

If desired it is also possible for 0.1% to 5% by weight, based on the total weight of the monomer mixture, of auxiliary monomers to be copolymerized. Preference is given to ethylenically unsaturated monocarboxylic and dicarboxylic acids such as acrylic acid and methacrylic acid; ethylenically unsaturated carboxamides and carbonitriles such as acrylamide and acrylonitrile; and ethylenically unsaturated sulphonic acids and their salts, preferably vinylsulphonic acid or 2-acrylamido-2-methylpropanesulphonic acid. Further examples are pre-crosslinking comonomers such as polyethylenically unsaturated comonomers, examples being divinyl adipate, diallyl maleate, allyl methacrylate and triallyl cyanurate, or post-crosslinking comonomers, examples being N-methylolacrylamide (NMA), alkyl ethers such as the isobutoxy ether or esters of N-methylolacrylamide.

The most preferred polymers are vinyl chloride-ethylene copolymers and vinyl acetate-ethylene copolymers without further comonomer units.

One or many water repellent agent(s) can be used, provided that at least one water repellent agent is not an organosilicon compound. In a preferred embodiment, the mix or water repellent agents does not comprise organosilicon compound, such as silicon oil or silane.

The water repellent agent content is advantageously at least 0.5 wt.-% by weight, more advantageously at least 1% by weight, even more advantageously at least 2 wt.-% by weight, expressed as dry mass relative to the dry cement mass.

For cost reasons, the water repellent agent content is advantageously less than 10 wt.-% by weight, more advantageously less than 6.5 wt.-%, percentage expressed by mass relative to the dry cement mass.

Preferably, the water repellent agent is in an amount ranging from 0.6 wt.-% to 6.5 wt.-%, more preferentially from 1.3 wt.-% to 4.8 wt.-%, even more preferentially from 2 wt.-% to 3 wt.-%, expressed as dry mass relative to the dry cement mass.

The water repellent agent is preferentially added with the cement during the preparation of the cement slurry.

Co-Stabiliser

According to the invention, a co-stabiliser may be added for increasing the stability and the water repellent behaviour of the mineral foam.

The co-stabiliser according to the invention is not a water-reducer or a high water-reducer, and thus is not a plasticiser or a superplasticizer.

In the context of the present invention, a "water-reducer" or a "plasticizer" is an agent which, in accordance with standard ADJUVANT NF EN 934-2 (September 2002), allows a water reduction for admixed concrete≥5% relative to control concrete. A "high water-reducing agent" or "superplasticizer" is an admixture which allows a water reduction for admixed concrete≥12% relative to control concrete.

The co-stabiliser according to the invention does not correspond to these characteristics.

The co-stabiliser is preferably a polyelectrolyte, in particular a polyanion.

The co-stabiliser is preferentially a polymer having constitutional unit derived from unsaturated carboxylic acid monomer or anhydride thereof. The carboxylic acid monomer can be monocarboxylic acid monomer or dicarboxylic acid monomer.

Examples thereof include:
- acrylic acid, methacrylic acid; crotonic acid, maleic acid, fumaric acid, itaconic acid, and citraconic acid, and their monovalent metal salts, divalent metal salts, ammonium salts, and organic amine salts, and anhydride thereof;
- esters, half esters and diesters of the above-mentioned unsaturated carboxylic acid monomers with alcohols having 1 to 12 carbon atoms, with alkoxy (poly) alkylene glycols, in particular with alkoxy (poly)ethylene glycol or with alkoxy (poly)propylene glycol;
- amides, half amides and diamides of the above-mentioned unsaturated carboxylic acid monomers with amines having 1 to 30 carbon atoms, such as methyl(meth) acrylamide, (meth)acrylalkylamide, N-methylol(meth) acrylamide, and N,N-dimethyl(meth)acrylamide;
- alkanediol of the above-mentioned unsaturated carboxylic acid monomers such as 1,4-butanediol mono(meth) acrylate, 1,5-pentanediol mono(meth)acrylate, and 1,6-hexanediol mono(meth)acrylate;
- amines of the above-mentioned unsaturated carboxylic acid monomers such as aminoethyl (meth)acrylate, methylaminoethyl (meth)acrylate, dimethylaminoethyl (meth)acrylate, dimethylaminopropyl (meth)acrylate, and dibutylaminoethyl (meth)acrylate;
- ammonium salts of the above-mentioned unsaturated carboxylic acid monomers such as [2-(Methacryloyloxy) ethyl]trimethylammonium chloride.

These monomers may be used either alone respectively or in combinations of two or more thereof. The monomer is in particular selected from acrylic acid, methacrylic acid, crotonic acid, maleic acid, fumaric acid, itaconic acid, and citraconic acid and anhydride thereof, in particular maleic anhydride, and mixtures thereof.

These monomers can also be copolymerised with hydrophobic monomers, in particular with:
- vinyl aromatic monomers such as styrene, alpha-methylstyrene, vinyltoluene, and p-methylstyrene;
- dienes such as butadiene, isoprene, 2-methyl-1,3-butadiene, and 2-chloro-1,3-butadiene;
- 1-alkenyl monomers having 2 to 12 carbon atoms, such as di-isobutylene.

The co-stabiliser is preferentially a copolymer of the above-mentioned unsaturated carboxylic acid monomers, or anhydride thereof, and of 1-alkenyl monomers having 2 to 12 carbon atoms, such as di-isobutylene. In particular the co-stabiliser is a copolymer of maleic anhydride and di-isobutylene.

The acid carboxylic function of the polymer is preferably totally or partially in a salt from. Advantageously the salt is a cation chosen from among the sodium, potassium, calcium, magnesium, ammonium, or their blends, preferentially chosen from among sodium or potassium and very preferentially sodium.

In a preferred embodiment, the co-stabiliser is a sodium salt of a maleic anhydride copolymer, in particular a sodium salt of a maleic anhydride and di-isobutylene copolymer. A commercial product commercialised by Dow, OROTAN 731 A ER, was found to be suitable for this invention.

In a particular embodiment, the co-stabiliser is a copolymer of methacrylic acid and one or several monomers as described above.

In an embodiment, the co-stabiliser is a polymeric surfactant that has a total molecular weight that is comprised between 1000 and 50000 g/mol, preferentially between 2000 and 20000 g/mol, even more preferentially between 3000 and 10000 g/mol.

The viscosity of the polymer, measured with LV torque Brookfield Viscometer, spindle 2, at 60 rotations per minute, at 25° C., preferably ranges from 20 to 160 mPa·s, more preferably from 20 to 130 mPa·s.

The co-stabiliser may be in powder form or a liquid.

The co-stabiliser can be added to the aqueous foam or to the cement slurry. The co-stabiliser is preferably to the aqueous solution comprising the foaming agent.

Cement Slurry

Cement is a hydraulic binder comprising at least 50 wt.-% of CaO and of $SiO_2$. Cement may therefore contain other components in addition to CaO and $SO_2$, in particular slag, silica fume, pozzolans (natural and calcined), fly ash (siliceous and calcic) and/or limestone.

Portland cement as used in the invention may be any type of Portland cement, whatever its chemical composition is, and in particular whatever its alkaline content is. Therefore, one of the advantages of the invention is not having to select a specific type of Portland cement. Advantageously, the Portland cement used in the invention is selected from the cements readily available on the market.

The suitable cement used in the invention is preferably the cements described according to the European standard NF EN 197-1 of April 2012 or mixtures thereof, preferably cement of the types CEM I, CEM II, CEM III, CEM IV or CEM V.

According to a preferred embodiment of the invention, the Portland cement has a specific surface (Blaine) of 3000-9000 $cm^2/g$, preferably 3500-6000 $cm^2/g$.

The cement may also be a mixture of a cement as described in the European standard NF EN 197-1 Standard of April 2012 with a mineral particles. Preferably, the cement used to produce the mineral foam according to the invention may comprise 0 to 50 wt.-% of mineral particles, more preferably from 0 to 40 wt.-%, most preferably from 0 to 30 wt.-%, the percentages being expressed by mass relative to the mass of slurry of foamed cement.

The mineral particles used according to the invention may be slags (for example, as defined in the European NF EN 197-1 Standard of April 2012, paragraph 5.2.2), pozzolanic materials (for example as defined in the European NF EN 197-1 Standard of April 2012, paragraph 5.2.3), fly ash (for example, as described in the European NF EN 197-1 Standard of April 2012, paragraph 5.2.4), calcined schists (for example, as described in the European NF EN 197-1 Standard of April 2012, paragraph 5.2.5), material containing calcium carbonate, for example limestone (for example, as defined in the European NF EN 197-1 Standard paragraph 5.2.6), silica fume (for example, as defined in the European NF EN 197-1 Standard of April 2012, paragraph 5.2.7), siliceous additions (for example, as defined in the "Concrete" NF P 18-509 Standard), metakaolin or mixtures thereof.

Fly ash is generally pulverulent particles comprised in fume from thermal power plants which are fed with coal. Fly ash is generally recovered by electrostatic or mechanical precipitation.

Slags are generally obtained by rapid cooling of molten slag resulting from melting of iron ore in a blast furnace.

Silica fume may be a material obtained by the reduction of very pure quality quartz by the coal in electric arc furnaces used for the production of silicon and alloys of ferrosilicon. Silica fume is generally formed of spherical particles comprising at least 85% by mass of amorphous silica.

The pozzolanic materials may be natural siliceous and/or silico-aluminous materials or a combination thereof. Among the pozzolanic materials, natural pozzolans can be mentioned, which are generally materials of volcanic origin or sedimentary rocks, and natural calcined pozzolans, which are materials of volcanic origin, clays, shale or thermally-activated sedimentary rocks.

In a specific embodiment, the cement is a mixture of 85-95% wt.-% of CEM I and 5-15 wt.-% of a mineral component, in particular a mixture of 90% wt.-% of CEM I and 10 wt.-% of a mineral component. The preferred mineral component is a limestone filler, such as Mikhart 1 supplied by La Provençale.

Cements that are less or not suitable for the realisation of the invention are calcium aluminate cements and their mixtures. Calcium aluminate cements are cements generally comprising a mineral phase C4A3$, CA, C12A7, C3A or C11A7CaF2 or their mixtures, such as, e.g., Ciment Fondu® (a calcium aluminate-based hydraulic binder), alumina cements, sulfoaluminate cements and calcium aluminate cements according to the European NF EN 14647 Standard of December 2006. Such cements are characterised by an alumina ($Al_2O_3$) content of ≥35 wt.-%.

Accordingly, the cement of the invention, or the mix of cements of the invention, comprises less than 35 wt.-%, expressed in mass in relation to the cement mass, of alumina ($Al_2O_3$).

The water/cement ratio (wt./wt. ratio) of the cement slurry prepared in step (a) is preferably from 0.25 to 0.5, more preferably from 0.28 to 0.35, in particular 0.29. The water/cement ratio may vary, for example due to the water demand of the mineral particles when these are used. The water/cement ratio is defined as being the ratio by mass of the quantity of water (W) to the dry Portland cement mass (C).

The cement slurry prepared in step (a) may comprise a water reducer, such as a plasticiser or a superplasticizer. A water reducer makes it possible to reduce the amount by weight of mixing water for a given workability by typically 10-15%. By way of example of water reducers, mention may be made of lignosulphonates, hydroxycarboxylic acids, carbohydrates, and other specific organic compounds, for example glycerol, polyvinyl alcohol, sodium alumino-methyl-siliconate, sulfanilic acid and casein as described in the Concrete Admixtures Handbook, Properties Science and Technology, V. S. Ramachandran, Noyes Publications, 1984.

Superplasticizers belong to a new class of water reducers and are capable of reducing water contents of mixing water, for a given workability, by approximately 30% by mass. By way of example of a superplasticizer, the PCP superplasticizers without an anti-foaming agent may be noted. The term "PCP" or "polyoxy polycarboxylate" is to be understood according to the present invention as a copolymer of acrylic acids or methacrylic acids and their esters of polyoxyethylene (POE).

Preferably, the cement slurry comprises 0.05 to 1%, more preferably 0.05 to 0.5% and more preferably 0.05 to 0.2% of a water reducer, a plasticiser or a superplasticizer, percentage expressed as dry mass relative to the dry cement mass.

Preferably, the cement slurry does not comprise an anti-foaming agent, or any agent having the property of destabilizing an air/liquid emulsion. Certain commercial super-plasticisers may contain anti-foaming agents and consequently these super-plasticisers are not suitable for the cement slurry used to produce the mineral foam according to the invention.

Preferably, the cement slurry used to produce the mineral foam according to the invention comprises 0.05 to 2.5 wt.-% of an accelerator, expressed as dry mass relative to dry cement mass. The accelerator may specifically reduce the setting times, increase strength development, or provide both features.

Foaming Agent and Aqueous Foam

According to the invention, a foaming agent is used for the preparation of the aqueous foam.

Preferably, the foaming agent is an organic protein derivative of animal origin (such as, e.g., the foaming agent named Propump26, a liquid solution of hydrolysed keratin, sold by the company Propump Engineering Ltd) or of vegetable origin. The foaming agents may also be a cationic surfactant (for example cetyltrimethylammonium bromide, CTAB), an ionic surfactant, an amphoteric surfactant (for example cocamidopropyl betaine, CAPB), or a nonionic surfactant, or mixtures thereof.

Any of the following commercial products comprising a foaming agent can be used:
  Propump 26 obtained from the company Propump Engineering Ltd having a dry extract of 26+/−2 wt.-%;
  MAPEAIR L/LA obtained for the company MAPEI, having a dry extract of 28+/−2 wt.-%;
  Foamcem LT2 supplied by the company Laston Italiana spa, having a dry extract of 28+/−2 wt.-%;
  PENTAMIX AER 907 supplied by Pentachem, having a dry extract of 30+/−2 wt.-%;
  mixtures thereof.

The foaming agent may be in powder form or a liquid.

The foaming agent is preferably used in an amount ranging from 0.25 to 10.00 wt.-%, preferably from 0.25 to 7.50 wt.-%, preferably from 0.25 to 5.00 wt.-%, preferably from 0.50 to 2.00 wt.-%, expressed in dry mass of foaming agent compared to the mass of water.

In a preferred embodiment, the aqueous foam comprises the co-stabiliser described above. In this embodiment, the co-stabiliser advantageously is in an amount ranging from 0.01 wt.-% to 0.15 wt.-%, more preferentially from 0.02 wt.-% to 0.10 wt.-%, even more preferentially from 0.025 wt.-% to 0.06 wt.-%, even more preferentially from 0.025 wt.-% to 0.05 wt.-%, expressed in dry mass compared to the mass of water.

The density of aqueous foam is typically between 10 and 100 kg/m$^3$.

Other Additives

According to an embodiment of the invention, other additives may be added to the cement slurry or the aqueous foam. Such additives may be thickening agents, viscosifying agents, air entraining agents, setting retarders, coloured pigments, hollow glass beads, film forming agents, hydrophobic agents or de-polluting agents (for example zeolites or titanium dioxide), latex, organic or mineral fibres, mineral additions or their mixtures. Preferably, the additives do not comprise any defoaming agents.

The expression "thickening agent", is generally to be understood as any compound making it possible to maintain the heterogeneous physical phases in equilibrium or facilitate this equilibrium. The suitable thickening agents are preferably gums, cellulose or its derivatives, for example cellulose ethers or carboxy methyl cellulose, starch or its derivatives, gelatine, agar, carrageenans or bentonite clays.

Methods

The mineral foam is prepared by a process comprising the following steps:
- a) Separately preparing a slurry of cement and an aqueous foam, wherein the cement slurry comprises water (W), at least one water repellent agent different from organosilicon compound, and Portland cement (C);
- b) Contacting the slurry of cement with the aqueous foam to obtain a slurry of foamed cement;
- c) Casting the slurry of foamed cement and leave it to set.

Preparation Method of the Aqueous Foam

The aqueous form is preferably prepared by
- i) preparing an aqueous solution comprising a foaming agent, then
- ii) preparing an aqueous foam from the aqueous solution of a foaming agent.

The aqueous foam may thus be produced by combining water and a foaming agent, then introducing a gas.

The foaming agent is preferably used in an amount ranging from 0.25 to 10.00 wt.-%, preferably from 0.25 to 7.50 wt.-%, preferably from 0.25 to 5.00 wt.-%, preferably from 0.50 to 2.00 wt.-%, expressed in dry mass compared to the mass of water.

This gas is preferably air.

The introduction of gas, preferably of air, may be carried out by stirring, by bubbling or by injection under pressure. Preferably, the aqueous foam may be produced using a turbulent foamer (bed of glass beads for example). This type of foamer makes it possible to introduce air under pressure into an aqueous solution comprising a foaming agent.

In an embodiment, before the aqueous foam is actually produced, an aqueous solution of a foaming agent is prepared, the aqueous solution of foaming agent being at a dosage comprised between 10 and 100 g/L, corresponding to between 0.25 and 2.50 wt.-% (dry mass) of foaming agent compared to the total mass of water. This aqueous solution is then pumped at a rate of 0.02 to 5.0 L/min into a foam generator which is constituted of a tube that is filled by smaller elements such glass beads, fibres, or small metallic or plastic components into which the air and aqueous solution are fed. Together with this flow of aqueous solution, air is injected into the foam generator at a pressure of 1 to 7 bars at a T-junction. Depending on the desired scale of production, this process can produce from 1 to 100 L/min of aqueous foam.

The aqueous foam can be produced continuously or in batches.

The co-stabiliser is preferentially added with the aqueous solution comprising the foaming agent.

The person skilled in the art would easily adjust the flow of air and solution of foaming agent to reach a desired density of aqueous foam, typically between 10 and 100 kg/m$^3$.

Preparation Method of the Cement Slurry

The cement slurry can be produced continuously or in batches.

In a continuous preparation process, a dry mixture of cement, optionally containing other powder elements, and mixing water, optionally containing chemical admixtures, are fed into a mixer, such as a dynamic mixer. The relative flow of materials is adjusted to reach the desired water-cement ratio in the cement slurry.

In a batch preparation process, a dry mixture of cement, optionally containing other powder elements, is placed in a mixing bowl. Mixing water, optionally containing chemical admixtures such as plasticizers and superplasticizers, is then added and the mixture is mixed until an homogeneous slurry of cement is obtained. An alternative method could also consist in adding the dry mixture of cement to a mixing bowl that already contains mixing water.

The water repellent agent is preferentially added with the cement slurry. More specifically the water repellent agent can be mixed together with the dry mixture of cement, with the mixing water, or added to the homogeneous cement slurry. The water repellent agent is preferentially added to the cement, homogeneously mixed, before water is added to form the slurry.

Preparation Method of the Mineral Foam

The mineral foam can be produced continuously or in batches.

In a batch preparation process, the cement slurry is carefully added and mixed with a batch of aqueous foam until the mix sufficient homogeneity.

More preferentially, the mineral foam is produced in a continuous production process, where the cement slurry is pumped together with the aqueous foam into a mixer, preferably a static mixer. The flow rates of both components are adjusted to reach the desired production throughput and density of fresh mineral foam. The mixer, such as the static mixer, is selected in order to minimise shear rates during the mixing, as excess shear within the mixer results in a destabilisation of the fresh mineral foam.

The table below provides, as examples, different flow rates and the result density of the fresh mineral foam as calculated with equation (1).

TABLE 1

| Air flow rate (L/min) | Aqueous solution of foaming agent flow rate (kg/min) | Density of resulting aqueous foam (kg/m$^3$) | Cement slurry flow rate (kg/min) | Theoretical density of resulting fresh mineral foam (kg/m$^3$) |
|---|---|---|---|---|
| 1 | 0.01 | 10 | 0.041 | 50 |
| 10 | 0.35 | 35 | 0.154 | 50 |
| 10 | 0.45 | 45 | 0.69 | 110 |
| 0.1 | 7 | 70 | 8.6 | 150 |

Slurry of Foamed Cement and Mineral Foam

The invention also relates to a slurry of foamed cement as obtained in step (b) of the process of the invention.

The slurry of foamed cement is characterized in that it comprises at least one water repellent agent different from organosilicon compound. The water repellent agent is dispersed within the slurry of foamed cement. The slurry of foamed cement may also comprise said co-stabiliser. In such a case, said co-stabiliser is also dispersed within the slurry of foamed cement.

Further, the invention also relates to a mineral foam obtained according to the process of the invention. The mineral foam is characterized in that it comprises at least one water repellent agent different from organosilicon compound. The water repellent agent is dispersed within the mineral foam, and thus also to the core of the mineral foam and not only at its surface. The mineral foam may also comprise said co-stabiliser. In such a case, said co-stabiliser is also dispersed within the mineral foam.

At step c), the fresh mineral foam is casted and setting occurs. The mineral foam can be cured, for example 24 hours at 20° C. and 100% relative humidity. After setting the mineral foam can be demoulded if required. After setting, further curing can be performed in order to gain sufficient compressive strength.

At step c), the fresh mineral foam can be cast into a cube to form a block. The block is advantageously cured, for example 24 hours at 20° C. and 100% relative humidity, after which the foam can be demoulded as the cement is set. The blocks of mineral foam can be further cured, for example 6 days at 20° C. and 100% relative humidity, in order to gain sufficient compressive strength.

Further, the invention also relates to a mineral foam obtainable according to the process of the invention.

The mineral foam comprises the water repellent agent described previously as well as, in preferred embodiment, the co-stabiliser disclosed previously. The water repellent agent is dispersed within the mineral foam, and thus also to the core of the mineral foam and not only at its surface. The co-stabiliser, if any, is also dispersed within the mineral foam. Advantageously, the water repellent agent and the co-stabiliser if any is (are) homogeneously distributed within the mineral foam. As a result the mineral foam retains its water repelling properties if the mineral foam is cut into a specific shape, damaged, or pierced through.

Preferably, the mineral foam according to the invention has a density, in its dry state, between 50 kg/m$^3$ and 200 kg/m$^3$, more preferentially between 50 kg/m$^3$ and 150 kg/m$^3$, even more preferentially between 50 kg/m$^3$ and 130 kg/m$^3$.

In a preferred embodiment, the mineral foam comprises the water repellent agent and the co-stabiliser. In that preferred embodiment, the mineral foam, in its dry state, has a density below 150 kg/m$^3$, preferably below 130 kg/m$^3$, preferably between 50 kg/m$^3$ and 150 kg/m$^3$, more preferentially between 50 kg/m$^3$ and 130 kg/m$^3$.

The mineral foam has water repellent properties. The water absorption at 24 hours of the mineral foam is less than 2 kg/m$^2$, preferably less than 1.5 kg/m$^2$, more preferably less than 1 kg/m$^2$, even more preferably less than 0.5 kg/m$^2$. The water absorption at 24 hours of the mineral foam is less than 2 kg/m$^2$, preferably less than 1.5 kg/m$^2$, more preferably less than 1 kg/m$^2$, even more preferably less than 0.5 kg/m$^2$. Alternatively, the water absorption at 24 hours can be above 0.2 kg/m$^2$. In an embodiment, the water absorption of the mineral foam is comprised between 0.2 and 1 kg/m$^2$, preferentially between 0.2 and 0.5 kg/m$^2$.

The invention provides another advantage in that the mineral foam according to the invention has excellent thermal properties, and in particular very low thermal conductivity. The thermal conductivity of the mineral foam according to the invention may be from 0.030 to 0.150 W/m·K, preferably from 0.030 to 0.060 W/m·K, more preferably from 0.030 to 0.055 W/m·K, the margin of error being ±0.4 mW/m·K.

Preferably, the mineral foam according to the invention has a very good fire resistance.

The mineral foam of the invention may be prefabricated. The mineral foam according to the invention may also be directly prepared on the jobsite by installing a foaming system on the jobsite.

The mineral foam according to the invention may be produced in a pre-cast production plant, on a mobile pre-cast mobile on a jobsite.

The invention also relates to an element of construction comprising the mineral foam according to the invention. The invention also relates to the use of the mineral foam according to the invention as construction material.

The mineral foam according to the invention may be used to cast walls, ceilings and roofs during a jobsite. It is also possible to realise prefabricated elements in a prefabrication plant, such as blocks or panels.

The invention also relates to the use of the mineral foam according to the invention as insulating material.

Advantageously, the mineral foam according to the invention makes it possible in certain cases to replace glass wool, mineral wool or polystyrene insulating material.

Advantageously, the mineral foam according to the invention may be used to fill empty or hollow spaces in a building, a wall, a partition wall, a brick, a floor or a ceiling. In this case, it is used as a filling compound. Such composite construction elements also constitute objects of the invention per se.

Advantageously, the mineral foam according to the invention may be used as facade lining to insulate a building from the outside. In this case, the mineral foam according to the invention may be coated by a finishing compound.

The invention also relates to a system comprising the mineral foam according to the invention. The mineral foam may be present in the system, for example as insulating material. The system according to the invention is a system capable of resisting to transfers of air and to thermohydric transfers, which is to say that this element has controlled permeability to transfers of air or water in the vapour or liquid form.

The system according to the invention, which resists to transfers of air and to thermohydric transfers in the construction field, comprises at least a framework. This framework may be secondary or primary. This framework may be of concrete (stud or beam), metal (support or beam), wood, plastics, composite material or a synthetic material. This framework may be a metal structure, a stud or a rail.

The system according to the invention may be used to produce a lining, an insulation system or a partition wall, for example a separation partition wall, a distribution partition wall or an inner partition.

The mineral foam according to the invention may be used to fill hollow parts of building blocs, such as cavity bricks. The foam may be filled into the cavity at any production step of the building bloc.

The mineral foam according to the invention may be cast vertically between two walls, for example between two concrete walls, two brick walls, two plasterboards, two wood walls, to obtain a system.

Use of the Water Repelling Agent and the Co-Stabiliser

The invention also relates to the use of at least one water repellent agent different from organosilicon compound, as defined above, and a co-stabiliser, as defined above, for the preparation of water repellent mineral foams having a density comprised between 50 kg/m$^3$ and 200 kg/m$^3$, more preferentially between 50 kg/m$^3$ and 150 kg/m$^3$, even more preferentially between 50 kg/m$^3$ and 130 kg/m$^3$.

The water absorption at 24 hours of the mineral foam is less than 2 kg/m$^2$, preferably less than 1.5 kg/m$^2$, more preferably less than 1 kg/m$^2$, even more preferably less than 0.5 kg/m$^2$. The water absorption at 24 hours of the mineral foam is less than 2 kg/m$^2$, preferably less than 1.5 kg/m$^2$, more preferably less than 1 kg/m$^2$, even more preferably less than 0.5 kg/m$^2$. Alternatively, the water absorption at 24 hours can be above 0.2 kg/m$^2$. In an embodiment, the water absorption of the mineral foam is comprised between 0.2 and 1 kg/m$^2$, preferentially between 0.2 and 0.5 kg/m$^2$.

The water repellent mineral foam is in particular obtained according to the process disclosed above, comprising the following steps:
  a) Separately preparing a slurry of cement and an aqueous foam, wherein the cement slurry comprises water (W), a water repellent agent different from organosilicon compound, and Portland cement (C);

b) Contacting the slurry of cement with the aqueous foam to obtain a slurry of foamed cement;
c) Casting the slurry of foamed cement and leave it to set.

The aqueous foam is advantageously prepared by
i) Preparing an aqueous solution of a foaming agent;
ii) Preparing an aqueous foam from the aqueous solution of a foaming agent and a co-stabiliser.

In particular, the water repellent agent is a vinyl chloride-ethylene copolymer, or a vinyl acetate-ethylene copolymer, and the co-stabiliser is a polyanion.

The invention will now be described by reference to the following non limitative examples.

EXAMPLES

Materials
In all the following examples:
The cement used was a mixture of 90 wt.-% of CEM I 52,5 R CE CP2 NF produced at the plant of Le Teil, France and 10 wt.-% of Mikhart 1;
The density of the cement slurry is equal to 2108.46 kg/m$^3$;
The plasticizer is a mixture comprising a polycarboxylate polyoxide (PCP) supplied by Mapei under the name of Bind'R, which does not comprise an anti-foaming agent, and the dry extract of Bind'R is 30+/−2 wt.-%;
The foaming agent used is MAPEAIR LA/L, diluted at a concentration of 25 g/L in the aqueous solution of foaming agent. The dry extract of MAPEAIR LA/L is 28 wt.-%.
one of the following water repellent agent is used:
Vinnapas® 3030 H (vinyl chloride and ethylene copolymer), supplied by Wacker, having a solid content of at least 98 wt %
Vinnapas® 5518 H (vinyl acetate and ethylene copolymer), supplied by Wacker, having a solid content of at least 98 wt %
The water repellent agent used in the comparatives examples are disclosed in table 8.
The co-stabiliser, if included in the example, is OROTAN 731-A ER supplied by Dow, a polymeric surfactant having a solid content of 25+/−2 wt.-%.
In all examples, tap water is used.

Equipment
Cement mixer:
A Turbotest mixer (MEXP-101, model: Turbotest 33/300, Serial No: 123861) supplied by the company Rayneri, which is a mixer having a vertical axis.
Pumps:
A pump having an eccentric screw conveyer Seepex™ of the type MD 006-24, commission no. 244920.
A pump having an eccentric screw conveyer Seepex™ of the type MD 006-24, commission no. 278702.
Foamer:
A foamer comprising a bed of glass beads of the type SB30 having a diameter of 2-2.5 mm filled up in a tube having a length of 500 mm and a diameter of 25 mm.
Static Mixer:
A static mixer comprised of 48 helicoidal elements of the type Kenics having a diameter of 19 mm.

Protocol
For each of the following example, the water repellent agent was initially mixed with the dry cement at a dosage of solid content comprised between 0.5 wt.-% and 10 wt.-% of the mass of dry cement. The water repellent agent is homogeneously mixed with the cement for optimal performance. This dry cement, containing the water repellent, is then mixed with water to form a homogeneous fresh cement slurry.

An aqueous foam is prepared by injecting a foaming solution into a foam generator. The foaming solution is prepared by diluting a foaming agent in water at a concentration comprised between 10 and 100 g/L of aqueous solution comprising the foaming agent, corresponding to between 0.25 and 2.50 wt.-% (dry mass) of the mass of water. If included in the test, the co-stabiliser is added to the foaming solution at a concentration of solid content between 0.1 and 5.0 g/L of aqueous solution comprising the foaming agent, corresponding to between 0.025% and 1.25 wt.-% (dry mass) of the mass of water.

The mineral foams of all the following examples were produced according to the following process:
1. 935 g of cement is introduced into the bowl of a cement mixer.
2. A water repellent agent, in powder form or in liquid form, is mixed with the cement binder and the dry composition is blended for a duration of 1 minute. The amount and the type of water repellent agent vary in each example.
3. The cement slurry is then prepared by adding mixing water gradually to the powder prepared in step 2 until reaching the desired water-cement ratio of 0.29. The mixing water contains an admixture, such as a superplasticizer.
4. An aqueous solution of foaming agent is prepared at a dosage of 25 g/L of foaming agent (corresponding to a dry extract of the aqueous solution of 7 wt.-%). A co-stabiliser, if included for the example, is added to the aqueous solution comprising said foaming agent.
5. An aqueous foam is prepared by injecting air into the solution of foaming agent, in a foam generator. The air flow is of 2.1 L/min, and the flow of foaming agent solution is of 0.098 L/min, unless specified differently in the example itself.
6. The fresh mineral foam is finally produced by mixing the cement slurry and the aqueous foam in a weight ratio of 1/0.66 to obtain mineral foam with 110 kg/m$^3$ (fresh density). The flow rates of cement slurry and aqueous foam are adjusted to reach a target density, as calculated with equation (1).

Example 1: Water Absorption of a Mineral Foam Produced with Polymeric Water Repellent Agents and without any Co-Stabiliser The water repellent agent that was used is the polymer VINNAPAS® 3030 H used at a dosage of 2.6 wt.-% of the weight of dry cement. No co-stabiliser is added to the mineral foam.

The amounts of aqueous foam and mineral slurry are calculated in order to obtain a mineral foam that has a fresh density of 110 kg/m$^3$ and are reported below:
Air flow rate (L/min): 2 L/min
Aqueous solution of foaming flow rate (kg/min): 0.092 kg/min
Density of resulting aqueous foam (kg/m$^3$) 45 kg/m$^3$
Cement slurry flow rate (kg/min) 0.144 kg/min The fresh density of the mineral foam is its density immediately after it exits the static mixer, before the cement sets and the free water evaporates. The measured fresh density was of 157 kg/m$^3$.

A block of mineral foam (length: 20 cm, width: 20 cm, height: 10 cm) is prepared and then dried (at 23° C., 50% relative humidity until the weight of the block is stable).

The water absorption was measured, following the method disclosed in the definition part. The water absorption of the mineral foam as a function of time is reported in the table below. After approximately 10 hours, the total amount of water absorbed appears to be constant (see table below). After 32 hours, the migration of water into the block of mineral foam is stopped (removal of the mineral block from the reservoir containing water).

TABLE 2

| Time (minutes) | 0 | 7 | 24 | 61 | 96 | 244 | 433 | 502 | 1436 | 1913 |
|---|---|---|---|---|---|---|---|---|---|---|
| Water absorption (kg/m²) | 0 | 0.51 | 0.66 | 0.81 | 0.88 | 1.08 | 1.19 | 1.23 | 1.32 | 1.34 |

Different amounts of polymeric water repellent agent were also tested, without any co-stabiliser added to the aqueous foam, and their effect on the fresh density of the mineral foam is provided in the table below. In all cases, the target theoretical density was not obtained.

TABLE 3

| | | | | |
|---|---|---|---|---|
| Amount of polymeric water repellent agent (wt.-% of amount of dry cement) | 2.6 | 4.8 | 6.5 | 6.5 |
| Target fresh density (kg/m³) | 110 | 110 | 110 | 150 |
| Air flow rate (L/min) | 2.1 | 2.1 | 2.1 | 2.1 |
| Aqueous solution of foaming agent flow rate (kg/min) | 0.096 | 0.096 | 0.096 | 0.096 |
| Density of resulting aqueous foam (kg/m³) | 45 | 45 | 45 | 45 |
| Cement slurry flow rate (kg/min) | 146.8 | 147 | 147.1 | 243 |
| Measured fresh density (kg/m³) | 157 | 134.5 | 147.4 | 195.2 |

Example 2: Fresh Densities of Mineral Foams Produced with Polymeric Water Repellent Agents and with a Co-Stabiliser A mineral foam is produced with a polymeric water repellent agent, VINNAPAS® 3030 H, used at a dosage of 2.6 wt.-% of the weight of dry cement.

A co-stabiliser, OROTAN 731-A ER, is added to the aqueous solution comprising the foaming agent at a dosage of 0.25 g or 0.5 g dry matter per litre of aqueous solution comprising the foaming agent (corresponding to 0.025 wt.-% or 0.05 wt.-% of the mass of water).

The table below provides the fresh density of the corresponding mineral foams, where the amounts of cement slurry and aqueous foam are adjusted to reach a target fresh density of 110, 150 or 200 kg/m³. The results show that in all cases, the target fresh foam density was achieved: in these conditions, the foams remain fully stable.

TABLE 4

| | | | | | |
|---|---|---|---|---|---|
| Amount of co-stabiliser in the aqueous solution (g/L) | 0.25 | 0.25 | 0.5 | 0.5 | 0.5 |
| Target fresh density of the mineral foam (kg/m³) | 110 | 200 | 110 | 150 | 200 |
| Air flow rate (L/min) | 8 | 8 | 8 | 8 | 8 |
| Aqueous solution of foaming agent flow rate (kg/min) | 0.366 | 0.366 | 0.366 | 0.366 | 0.366 |
| Density of resulting aqueous foam (kg/m³) | 45 | 45 | 45 | 45 | 45 |
| Cement slurry flow rate (kg/min) | 0.56 | 1.4 | 0.56 | 0.92 | 1.4 |
| Measured fresh density of the mineral foam (kg/m³) | 107 | 192.2 | 110.5 | 145.9 | 202.3 |

Example 3: Water Absorption of Mineral Foams Produced with a Polymeric Water Repellent Agent at Different Dosages and with a Co-Stabiliser, as a Function of the Amount of Polymeric Water Repellent Agent In this example, the water repellent agent that was used was VINNAPAS® 3030 H at different dosages.

The mineral foams prepared for this example have an ultra-low density of 70 kg/m³. The flow rates of the cement slurry and the aqueous foam are adjusted to reach a target density of 70 kg/m³ (see Equation 1 above).

A co-stabiliser, OROTAN 731-A ER, is added to the aqueous solution comprising the foaming agent at a dosage of 0.25 g/L dry matter per litre of aqueous solution comprising the foaming agent (corresponding to 0.025 wt.-% of the mass of water).

In this example, the impact of the dosage of water repellent is assessed, from 0 to 6.5 wt.-% of the weight of dry cement. Table 5 summarises the results, which show that there is an optimal dosage of polymeric water repellent agent: above 2.6 wt.-%, the water absorption remains below 0.5 kg/m², which is a preferred level for the application of this invention. Increasing the dosage of the polymeric water repelling agent does not significantly affect the water absorbance of the mineral foam. For cost reasons, it is therefore preferred to remain at a dosage of polymeric water repellent agent of less than 5 wt.-% of the weight of dry cement.

TABLE 5

| | | | | | | | | |
|---|---|---|---|---|---|---|---|---|
| Amount of polymeric water repellent agent (wt.-%) | 0.0 | 1.3 | 1.9 | 2.3 | 2.6 | 3.9 | 4.8 | 6.5 |
| Water absorption at 24 hours (kg/m²) | 2.2 | 1.74 | 0.98 | 0.7 | 0.38 | 0.35 | 0.45 | 0.33 |

Example 4: Water Absorption of Mineral Foams Produced with a Polymeric Water Repellent Agent at Different Dosages and with a Co-Stabiliser, as a Function of the Amount of Polymeric Water Repellent Agent In this example, the water repellent agent that was used was VINNAPAS® 5518 H at concentration of 2.6 wt.-% of the weight of dry cement.

The co-stabiliser, OROTAN 731-A ER, is added to the aqueous solution comprising the foaming agent at a dosage of 0.25 g/L dry matter per litre of aqueous solution comprising the foaming agent (corresponding to 0.025 wt.-% of the mass of water).

The flow rates of the cement slurry and the aqueous foam are adjusted to reach a target density of 110 kg/m³ (see Equation 1 above).

Results are summarised in table below.

| | |
|---|---|
| Measured fresh density | 137 kg/m³ |
| Measured dry density | 91.0 kg/m³ |
| Water absorption | 0.62 kg/m² |

Example 5: Mineral Foam of Different Dry Densities with a Polymeric Water Repellent Agent In this example, VINNAPAS® 3030 H is used at concentration of 2.6 wt.-% of the weight of dry cement.

A co-stabiliser (OROTAN 731-A ER) is used at a dosage of 0.25 g/L of the aqueous solution comprising the foaming agent (corresponding to 0.025 wt.-% of the mass of water).

Table summarises the water absorption as a function of the dry density of the mineral foam. The results show that mineral foams of higher density tend to absorb less water.

| Measured dry density of the mineral foam (kg/m³) | 68.0 | 107.7 | 152.0 |
|---|---|---|---|
| Water absorption (kg/m²) | 0.74 | 0.51 | 0.46 |

Example 6: Use of Other Types of Polymeric Surfactants as Co-Stabilisers for the Preparation of Water Repellent Foams In all of the previous examples, OROTAN 731-A ER is used as a co-stabiliser of the water repellent mineral foam. This example aims at testing different types of polymeric surfactants, as alternative co-stabilisers.

Several polymeric surfactants have then been synthesized by RAFT polymerisation (Reversible Addition-Fragmentation Chain Transfer). The initiator used for the preparation of these polymers is azobisisobutyronitrile (AIBN), and the controlling agent is 2-Cyano-2-propyl benzodithioate (CPDB). All reactions have been carried out in tetrahydrofuran (THF).

The polymerisation reaction is carried out in a manner to reach a total molecular weight that is comprised between 1000 and 50000 g/mol, preferentially between 2000 and 20000 g/mol, even more preferentially between 3000 and 10000 g/mol. The skilled in the art person will easily adjust the amount of initiator, of controlling agent, and the duration of the polymerisation reactions, to achieve the desired molecular weight.

The monomers that have been used for synthesising water repellent polymers are the following:
Monomer A: methacrylic acid
Monomer C: 2-ethylhexyl methacrylate (ramified C8)
Monomer D: butyl methacrylate (C4)
Monomer H: poly(ethylene glycol) methacrylate methyl ether (MMPEG-300)
Monomer I: [2-(Methacryloyloxy)ethyl]trimethylammonium chloride The polymerisation is carried out according to the following protocol:
The monomers, the controlling agent CPDB and the solvent THF are weighed and placed in a chemical reactor, equipped with a ball condenser, and a magnetic stirrer
The mixture is placed under nitrogen bubbling and heated to a temperature of 65° C., using an oil bath
Once the temperature of 65° C. is reached and stabilised, the initiator AIBN is introduced into the reactor
The nitrogen bubbling is then stopped and replaced by a flow of nitrogen onto the surface of the THF The reaction is stopped after a duration of 6 hours, and the polymer is neutralised by adding a solution of sodium hydroxide at a concentration of 2 mol/L
The polymer is then dissolved in water in a way to achieve a solid content of 25 wt.-%.

Using this protocol, several polymers have been synthesised by selecting different monomers and different ratios according to the table 8 provided below. The resulting molecular weights Mn are provided, and are obtained from the following calculation:

$$M_{n\ calculated} = \sum_i \left( \frac{[\text{monomer } i]}{[CPDB]} M_{W\ monomer\ i} \right) + M_{w\ CPDB}$$

Where:
[monomer i] is the initial molar concentration of monomer i
[CPDB] is the initial molar concentration of controlling agent
$M_{W\ monomer\ i}$ is the molecular weight of the monomer i
$M_{w\ CPDB}$ is the molecular weight of the initiator

TABLE 8

| Polymer | Monomer weight (g) | | | | | Controlling agent CPDB | Initiator AIBN | THF | NaOH 2 mol/L | WAter | Molecular weight Mn |
|---|---|---|---|---|---|---|---|---|---|---|---|
| reference | A | C | D | H | I | (in g) | (in g) | (g) | (in g) | (in g) | (g/mol) |
| AM19 | 20.02 | 0 | 14.18 | 0 | 0 | 1.501 | 0.36 | 54 | 92.13 | 33.26 | 5430 +/− 100 |
| AM24 | 12.40 | 0 | 9.46 | 3.35 | 0 | 1.000 | 0.24 | 35 | 57.04 | 22.90 | 5970 +/− 100 |
| AM31 | 7.62 | 2.98 | 9.45 | 0 | 11.39 | 1.001 | 0.24 | 28 | 35.05 | 26.42 | 7390 +/− 100 |

The polymeric surfactants were tested as co-stabilisers to prepare a water repellent mineral foam, following the same protocol described above in example 1:

an aqueous foam is first prepared by dissolving 8.33 g of foaming agent (Propump26), polymeric surfactants in 291.3 g of water, in order to produce an aqueous foam having a density of 45 kg/m³, according to the protocol described above; the type and amount of polymeric surfactant is given in the table 9 below, as well as the resulting performance of the water repellent mineral foam, a cement slurry is prepared, containing the water repellent agent, VINNAPAS® 3030 H at a dosage of 2.6 wt.-% of the weight of dry cement, the aqueous foam is then blended with the cement slurry in order to reach a density of fresh mineral foam of 110 kg/m³.

The results given in the table 9 below show that the different polymeric surfactants are able to achieve the same results in terms of foam stability as the commercial product OROTAN 731-A ER: the mineral foams remain all stable during their preparation and the average size of the bubbles remains overall comparable.

The average size of the bubbles is measured by cutting a bloc of foam and measuring the sizes of about 30 bubbles with a ruler. The typical range measured is then given an additional indication of the stability of the mineral foam.

In all cases, the mineral foams retained their water repellent characteristics, as the water absorption after 24 hours remains below 1.5 kg/m²

TABLE 9

| Test number | Amount and type of co-stabiliser | Mineral foam stability | Range of bubble sizes in the hardened mineral foam (mm) | Water absorption after 24 hours (kg/m²) |
| --- | --- | --- | --- | --- |
| Reference | 0.33 g OROTAN 731-A ER | Stable | 1-2 | 1.13 |
| 1 | 0.33 g AM19 | Stable | 0.5-2 | 1.37 |
| 2 | 0.66 g AM19 | Stable | 0.5-1 | 1.04 |
| 3 | 0.33 g AM24 | Stable | 1-4 | 0.95 |
| 4 | 0.33 g AM31 | Stable | 3-5 | 1.00 |
| 5 | 0.67 g AM31 | Stable | 2-4 | 1.09 |

The mineral foams obtained in this example remained homogeneous and stable, and its water repellent effect is maintained as it only absorbed 1 kg/m² in 24 hours (measured as described in the protocol given in example 1).

Comparative Example 1: Mineral Foams with Organosilicon Compound

Several water repellent agents based on silicon oils and silanes were tested at a dosage (solid content) of 1 and of 2 wt.-% of the total amount of dry cement. Table 10 below summarises the silicon oil and silanes tested in this example.

TABLE 10

| Name | Description | Supplier | Aspect | Solids content (wt.-%) |
| --- | --- | --- | --- | --- |
| Silres BS 1801 | mixture of octyltriethoxysilane and isomers thereof | Wacker | Transparent liquid | 99 |
| Silres BS 1802 | Silanes, Organofunctional | | White liquid | 50 |
| Silres BS 66 | oligomeric siloxane | | Liquid | 100 |
| Silres 17040 | silane emulsion. | | White liquid | 40 |
| Xiameter PMX 200 Silicone Fluid 350 | polydimethylsiloxane polymer | Dow Corning | Liquid oil | 100 |
| Sitren P750 | alkylpolysiloxane | Evonik | Powder | 100 |

No co-stabiliser was used for this example.

The flow rates of the cement slurry and the aqueous foam are adjusted to reach a target density of 110 kg/m³ (see Equation 1 above).

All mineral foams produced with organosilicon compound and without any co-stabiliser were not stable: they collapsed in their fresh state, rendering all subsequent measurements impossible.

In these tests, we could not replicate the behaviour and performance reported in the patent DE102010062762, where foams of 130 kg/m³ are reported to be have to produced.

Comparative Example 2: Mineral Foam Produced with Organosilicon Compound and a Co-Stabiliser The mineral foams of this example were produced by incorporating silicon oils and organosilanes, as described in table 10 of comparative example 1, in the cement at a concentration of 1 wt.-% of the amount of cement.

The co-stabiliser is OROTAN 731-A ER supplied by Dow, and is added to the solution of foaming agent prior to producing the aqueous foam.

The flow rates of the cement slurry and the aqueous foam are adjusted to reach a target density of 110 kg/m³ (see Equation 1 above).

Two types of behaviours were observed. In most fresh mineral foams collapsed prior to the setting of the cement. In some cases, it was possible to produce a stable fresh low density mineral foam, however, these foams were not sufficiently water repellent, as shown in the results summarised in the table below.

TABLE 11

| | Supplier | Concentration of water repellent agent (wt.-% of cement) | Water absorption (kg/m²) |
| --- | --- | --- | --- |
| Reference with no water repellent agent | N.A. | 0 | 4.9 |
| Xiameter PMX 200 | Dow Corning | 1 | 3.7 |

The water absorption measured is above 2 kg/m², which is not suitable for this invention.

The invention claimed is:

1. A process for producing a mineral foam having water repellent properties comprising:
  a) separately preparing a slurry of cement and an aqueous foam, wherein the cement slurry comprises water, at least one water repellent agent different from organosilicon compound, and Portland cement and the aqueous foam comprises a co-stabiliser which is a salt of a maleic anhydride copolymer;
  b) contacting the slurry of cement with the aqueous foam to obtain a slurry of foamed cement; and c) casting the slurry of foamed cement and leave the slurry of foamed cement to set.

2. The process according to claim 1, wherein the water repellent agent is an organic polymer.

3. The process according to claim 1, wherein the water repellent agent is in an amount ranging from 0.6 wt.-% to 6.5 wt.-% expressed as dry mass relative to the dry cement mass.

4. The process according to claim 1, wherein the aqueous foam comprises water and the co-stabiliser is in an amount ranging from 0.01 wt.-% to 0.15 wt.-%, expressed in dry mass compared to the mass of water in the aqueous foam.

5. The process according to claim 1, wherein the cement slurry used for the preparation of the mineral foam has a water cement weight ratio between 0.28 and 0.35.

6. The process according to claim 1, wherein the Portland cement is a cement of the type CEM I, CEM II, CEM III, CEM IV or CEM V.

7. The process according to claim 1, wherein the Portland cement has a specific surface (Blaine) of 3000-9000 $cm^2/g$.

8. The process according to claim 1, wherein contacting the slurry of cement with the aqueous foam comprises introducing the slurry of cement and the aqueous foam into a mixer to obtain a slurry of foamed cement in a continuous manner.

9. The method according to claim 1, wherein the water repellent agent is a vinyl chloride-ethylene copolymer or vinyl acetate-ethylene copolymer and wherein the co-stabiliser is a polyanion.

10. A mineral foam having water-repellent properties obtained by a process comprising:
   a) separately preparing a slurry of cement and an aqueous foam, wherein the cement slurry comprises water, at least one water repellent agent different from organo-silicon compound, and Portland cement and the aqueous foam comprises a co-stabiliser which is a polyelectrolyte;
   b) contacting the slurry of cement with the aqueous foam to obtain a slurry of foamed cement; and
   c) casting the slurry of foamed cement and leaving the slurry of foamed cement to set;
   the mineral foam having a water absorption at 24 hours of less than 1 $kg/m^2$ and a density in a dry state between 50 $kg/m^3$ and 200 $kg/m^3$.

11. The mineral foam according to claim 10, wherein the mineral foam is formed from a water repellent agent comprising vinyl chloride-ethylene copolymer or vinyl acetate-ethylene copolymer and a co-stabiliser comprising a polyanion.

12. An insulating material comprising the mineral foam according to claim 10.

13. An element of construction comprising the mineral foam according to claim 10.

14. The mineral foam according to claim 10, wherein the mineral foam has a water absorption at 24 hours of less than 0.5 $kg/m^2$.

15. The mineral foam according to claim 10, wherein the density of the mineral foam in the dry state is between 50 $kg/m^3$ and 130 $kg/m^3$.

16. The process of claim 1, wherein the co-stabilizer is in an amount range from 0.02 wt.-% to 0.1 wt.-%.

17. The process of claim 1, wherein the water repellent agent is in an amount ranging from 1.3 wt.-% to 4.8 wt.-%.

18. The process of claim 1, wherein casting the slurry of foamed cement and leaving the slurry of foamed cement to set comprises forming a mineral foam having a density in a dry state of between 50 $kg/m^3$ and 200 $kg/m^3$.

\* \* \* \* \*